Nov. 3, 1931.　　M. J. FORRESTER　　1,829,824
LICENSE PLATE HOLDER
Filed Oct. 28, 1929　　2 Sheets-Sheet 2
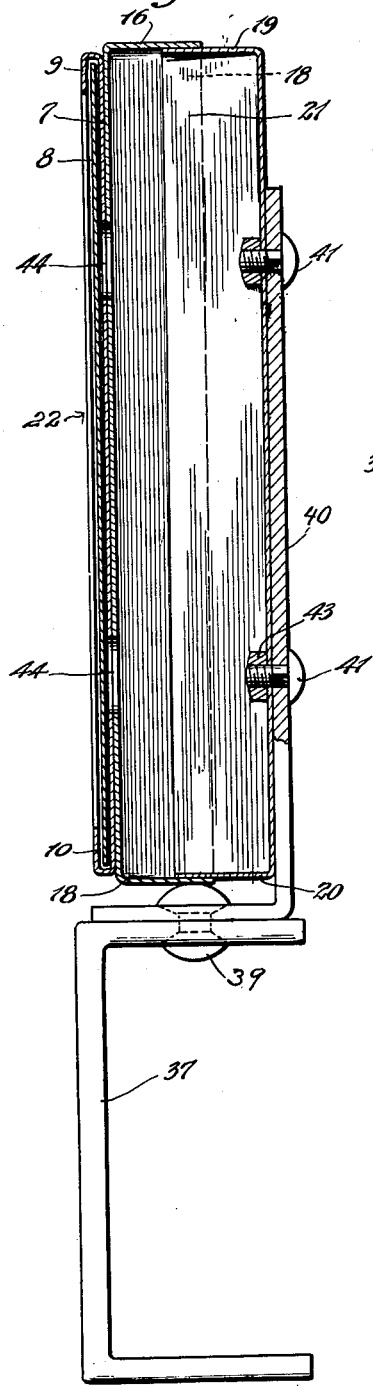
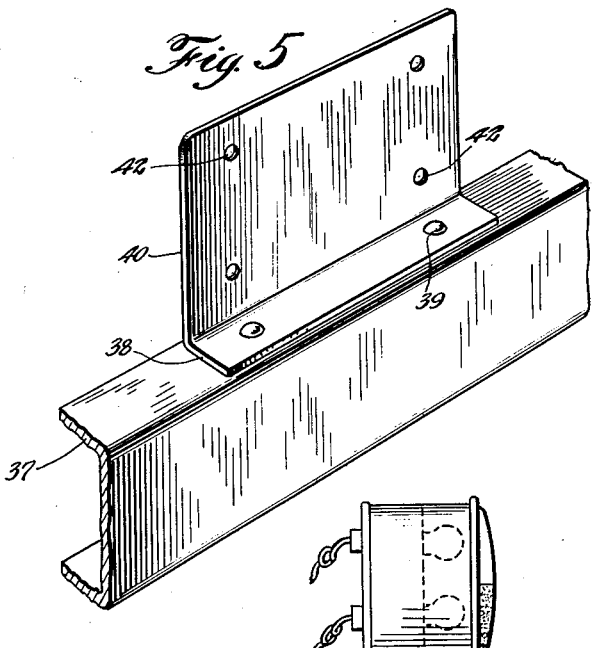
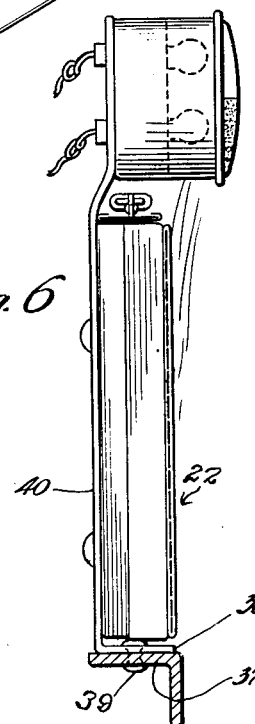
INVENTOR.
Michael J. Forrester
BY Morrison, Kennedy & Campbell
ATTORNEYS.

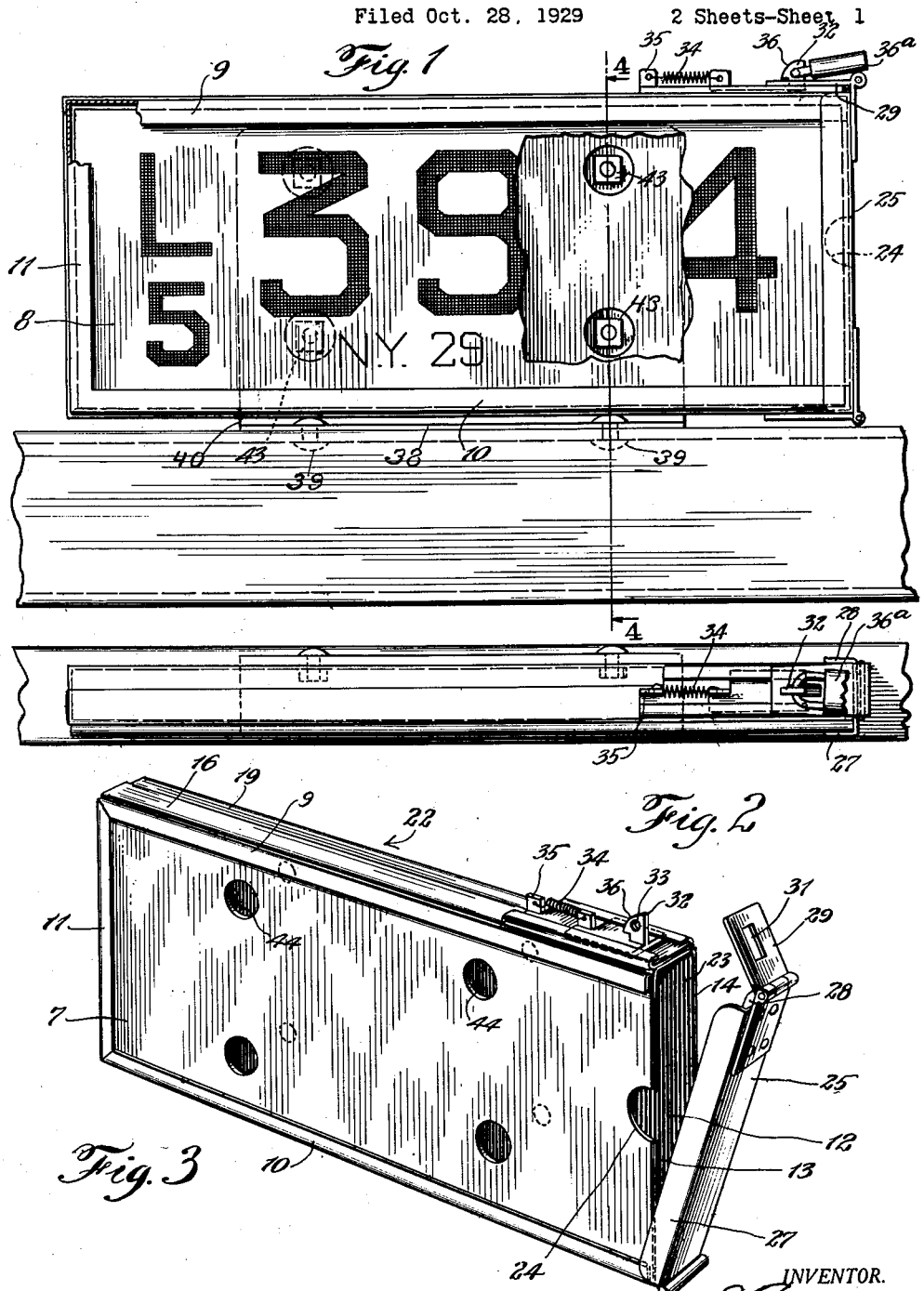

Patented Nov. 3, 1931

1,829,824

UNITED STATES PATENT OFFICE

MICHAEL J. FORRESTER, OF ASTORIA, NEW YORK, ASSIGNOR TO FIFTH AVENUE COACH COMPANY, A CORPORATION OF NEW YORK

LICENSE PLATE HOLDER

Application filed October 28, 1929. Serial No. 402,826.

This invention relates to license plate holders; and while it may be embodied in constructions adapted for various purposes, it is more particularly concerned with license plate holders for vehicles, such as passenger buses, trucks and the like, traveling in various jurisdictions where different license plates are required to be shown in the respective jurisdictions.

It is common practice in the transportation industry for motor vehicles to make regular trips through several States or jurisdictions, and it is necessary, as stated, to display a different license plate in each State or jurisdiction so visited. The plates, when in use, are displayed or exposed at the front and rear of the automobile, and so arranged and located that the reading matter on them will be illuminated by the lights of the automobile or car, as it may now be called. It is highly desirable that the plates should be stored until needed in such manner and place in the car as to be immediately available for use and, preferably, in the order of their use. It is also desirable that the plates, while in storage, be kept safe from injury and from unnecessary soiling.

With these and other various objects in view, the present invention offers to the art a license plate holder so arranged that a license plate can be held thereon in exposed position, and said holder having means arranged in the rear thereof for the storage of a plurality of license plates, each interchangeable with the plate in exposed position. The license plate holder, also, is of such construction that it can be arranged on the rear of the car in proper relation to the lights thereof, so that the reading matter or indicia on the plate will be illuminated by said lights.

A license plate holder constructed in accordance with the principles of the invention comprises a support for a license plate, means for holding the plate thereon in exposed position, and a container arranged in the rear of said support for storing a plurality of license plates, each interchangeable with the said exposed plate, said container being open at one end to permit the insertion and withdrawal of said plates. Associated with the holder, also, is a carrying element therefor, said element preferably comprising a base adapted to be attached to the bumper or other part of a car, and a vertical bracket plate rising from the base, to which plate the license plate holder can be securely fixed. These and other features of the invention will be more fully set forth in the following description.

Of the drawings:

Fig. 1 is a front elevation of a license plate holder mounted on its carrying element, constructed in accordance with the principles of the invention, and showing the same attached to a bumper of a car, parts being broken away;

Fig. 2 is a top plan view of the same;

Fig. 3 is a perspective view of the storage container, illustrating certain details thereof;

Fig. 4 is a cross section taken on the line 4—4 of Fig. 1, looking in the direction of the arrows;

Fig. 5 is a fragmentary perspective view of the front bumper of a car, showing mounted thereon the carrying element for the license plate holder proper; and Fig. 6 is a view, partly in cross section, showing a rear bumper of a car and the carrying element and storage container mounted thereon, and partly in perspective showing the rear lights of the car.

Referring in detail to the drawings and according to one feature of the invention, the preferred embodiment of the invention illustrated therein comprises a fixed supporting back 7, see Figs. 1 and 2, for supporting a license plate 8 in exposed position, said supporting back being of suitable dimensions and strength, preferably being formed of sheet steel, to support any of the conventional license plates, which are practically uniform in size and shape.

Means are provided for holding the license plate 8 in such exposed condition on the supporting back, and as shown, see particularly Figs. 1 and 2, said supporting back is turned inwardly at its upper and lower longitudinal edges and at one end to form flanges 9, 10 and 11, respectively, these flanges forming with the body of the supporting back, grooves within which a license plate can be slid from the opposite or open end of the supporting back into exposed position thereon and supported there.

In accordance with another feature of the invention, means are provided for storing in convenient proximity to the license plate supporting back 7, a plurality of license plates 12 which can be severally interchanged with the exposed license plate, that is to say, the exposed license plate 8 can be removed from its place on the supporting back and set in its proper place among the stored plates 12, and one of the latter plates, if required, can be placed in exposed position on the supporting back 7. Preferably and as shown, this storing means is arranged in the rear of the supporting back, there being out of view but conveniently and immediately accessible.

Said storing means or container comprises front and rear walls 13, 14 respectively, preferably also formed of sheet steel, and arranged a sufficient distance apart, see Fig. 3, to contain between them the required number of license plates 12 to be used with the particular car, and these walls are joined together at the top and bottom and at one end. As best shown in Fig. 4, this jointure of the said walls is preferably effected by the turning in of the longitudinal edges and of one end of the respective container walls 13, 14, the turned in edges and end 16, 17 and 18, respectively, of one wall, as the front wall, overlapping the corresponding turned in edges and end 19, 20 and 21, respectively, of the other or rear wall. These overlapping portions of the said walls are secured together in any suitable manner, as for instance by welding. Thus is conveniently and inexpensively produced a durable storage container designated by the numeral 22 of sufficient capacity for its purpose, and yet inconspicuous because of its location in the rear of the license plate supporting back 7, and, by reason of said location, extremely convenient for use.

In this storage container the inactive license plates 12 are arranged vertically and preferably in the order of their proposed use, the plate first to be used, or to be used first in succession to an active plate on view, if any, being placed in the forward position immediately behind the supporting back 7 and the front wall 13, and the remaining plates following behind in the order in which they will be required. When the active license plate 8 is removed from its exposed position on the supporting back 7, it will be placed in the storage container 22 at the rear of the plates 12 already there, and the first plate in the series will be removed and placed in the exposed position on the front of the license plate supporting back 7. This placing of the plates in the container 22 and removal therefrom is permitted by the open end 23 of said receptacle 22, see Fig. 3, and the handling of the plates, when thus transferred, is facilitated by a recess 24 in the open end of the supporting back 7 and front wall 13.

To guard against accidental dislodgement or loss of the license plates from the interior of the storage container 22, and the exposed plate 8 from its place on the supporting back 7, a door 25 is hingedly mounted on the storage container 22 at the open end thereof and preferably at the bottom. This door is provided with front and rear flanges 27, 28 to insure a satisfactory closure, and the front flange 28 will form with the body of the license plate supporting back 7, a groove corresponding to the grooves formed by the flanges 9, 10 and 11, thus completing a framework about the edges of the supporting back 7, which will securely retain the active plate in its exposed position on said back.

Suitable locking means are provided, preferably on the top of the storage receptacle 22, for engaging a clasp 29, formed with an aperture 31 and hingedly mounted on the top of the door 25, see Figs. 1, 2 and 3. These locking means consist of a detent 32 formed with an aperture 33, at one end, and at the other end being connected to a spring 34 anchored to a lug 35 on the top side of the retainer 22. The detent 32 has a curved edge 36 to facilitate the engagement of the clasp 29 therewith. The door 25 can be locked in closed position, if desired, and by means, for example, of a padlock 36a the shackle of which can be inserted through the aperture 33 in the detent 32, as shown in Fig. 1. When the door is in closed position, the plates 12 in storage in the container 22 are kept safe from injury or dislodgment.

A license plate holder constructed in accordance with certain features of the invention, as heretofore described, can be attached to either the front or rear bumper of a car, see Figs. 5 and 6, and for this purpose is preferably of a thickness corresponding to the width of the top plate of a bumper. While, therefore, a license plate holder can be attached directly to the top plate 37 of a bumper, whether front or rear, it is preferred for convenience to secure the holder to a carrying element which in turn is fastened to the bumper.

As shown, this carrying element consists of a horizontal base portion 38 which is fastened, as with rivets 39, to the top 37 of the bumper, and is of substantially the same width as said top, and a vertical bracket plate 40 extending upwardly from the rear end of said base portion, to which the license plate holder is fastened, as with screw bolts 41, see Fig. 1, the bracket plate 40 being for this purpose formed with apertures 42 symmetrically disposed therein, through which apertures the bolts 41 project into the interior of the storage container 22 and are locked with nuts 43. In order to reach these nuts 43 with a proper tool to screw them on the bolts, the front wall 13 of the storage container and the license plate supporting back 7 are formed with apertures 44 in registry with the apertures 42 in the bracket plate 40 of the supporting element. This method of fastening the license plate holder to its carrying element is much more convenient and feasible than if the holder were, itself, fastened directly to the bumper. Further, the license plate holder can be located on its carrying element in any desired position vertically, and preferably it is located above the horizontal base portion 38 a distance sufficient to allow the free opening and closing movements of the door 25. The bracket plate 40 is made large enough to afford sufficient support for the license plate holder, but preferably it is hidden from view, by being made of a size not to extend in any direction beyond the periphery of the license plate holder. As will be seen from the drawings, the entire device can be arranged at any desired position on a bumper, and it is located in duplicate in such positions on both the front and rear bumpers, that the faces of the license plates will be illuminated by the lights of a car. While the license plate holder is constructed so as to be available for use on either the front or rear bumpers of a car, in practice two such holders are used on one car, as license plates must be exposed both at the front and at the rear of any car in use.

A license plate holder constructed in accordance with the principles of the invention, as herein shown and described, will carry out the objects of the invention as heretofore enumerated, besides possessing other advantages which will be apparent to those skilled in the art.

In its broader aspects, the invention is not limited to the precise construction shown and described, as many changes may be made in the details thereof without departing from the main principles of the invention or sacrificing its chief advantages.

I claim:—

1. A license plate holder comprising a fixed supporting back for a license plate adapted to be arranged in an upright position on the exterior of an automobile, inwardly extending flanges on said back forming grooves along the upper and lower longitudinal edges and one end of said back for holding a license plate removably in exposed upright position upon said back, a covered container located in the rear of said back for storing a plurality of license plates, each interchangeable with the exposed plate, said container being open at its end opposite the grooved end of said back to permit the insertion and withdrawal of said plates, and a hinged cover for said open end of the container.

2. A license plate holder comprising a support for a license plate, means for holding a license plate on said support in exposed position, and a covered container located in the rear of said support for storing a plurality of license plates, each interchangeable with the exposed plate, said container being open at one end to permit the insertion and withdrawal of said plates, and a cover for said open end hingedly mounted at the bottom thereof, and locking means for said cover comprising an apertured hinged clasp on the top of said cover and on the top of the container a sloping faced detent adapted to be engaged by the apertured clasp, a spring connected with the detent to hold the same in locking engagement, and an anchor for said spring.

3. A license plate holder comprising a carrying element adapted to be fastened to the bumper of a motor car and presenting a horizontal base and a vertical bracket plate, and a license plate container having front and rear walls adapted to contain between them a plurality of license plates, the rear wall of said container being fastened to said bracket plate of the supporting element with spaced apart fastening members extending through said rear wall, and the front wall of said container being formed with apertures therethrough and in register with said spaced apart extending fastening members, whereby a tool can be inserted through said apertures to operate on said fastening means, and means on said front wall for removably holding in exposed position, the license plate that is to be displayed.

4. A license plate holder adapted to be arranged in an upright position on the exterior of an automobile comprising in combination a container for holding a number of interchangeable license plates, said container consisting of two sheet metal plates, having their longitudinal edges and one side edge turned inwardly to form flanges, with the flanges of one plate overlapping the corresponding flanges of the other plate, and said overlapping flanges being fastened together to form a hollow container open at one end adapted to store a number of interchangeable license plates, and a metal sheet attached to the front of said container and forming a fixed supporting back for a license plate to be exposed in upright position, said sheet being provided with inwardly extending flanges at its longitudinal edges and at one end to form in connection with said sheet, grooves for holding a license plate removably in exposed position and a hinged cover for said open end of the container having a flange projecting over the free end of said metal sheet.

In testimony whereof, this specification has been duly signed by:

MICHAEL J. FORRESTER.